Patented Nov. 5, 1940

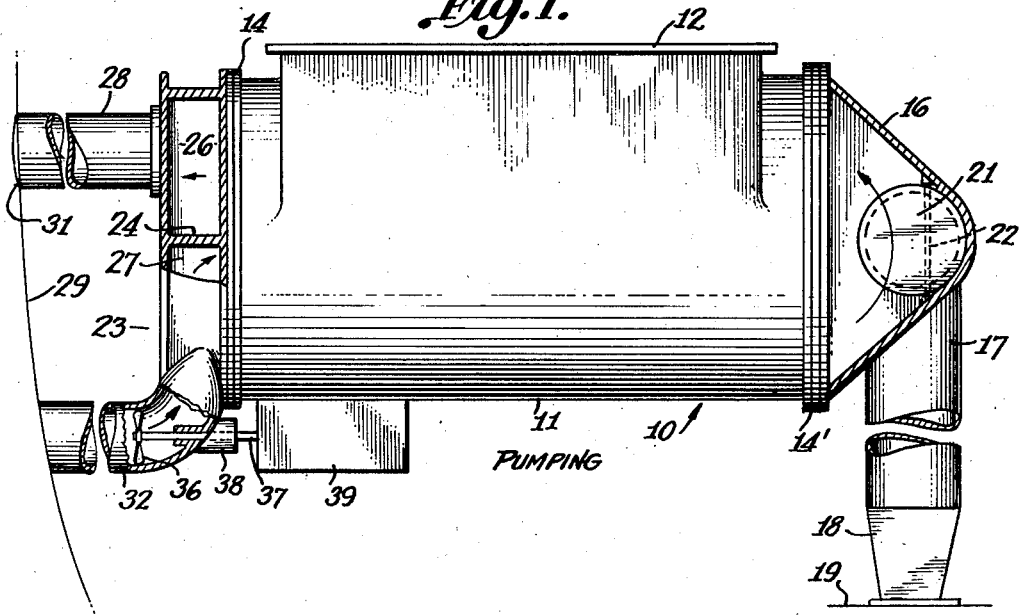
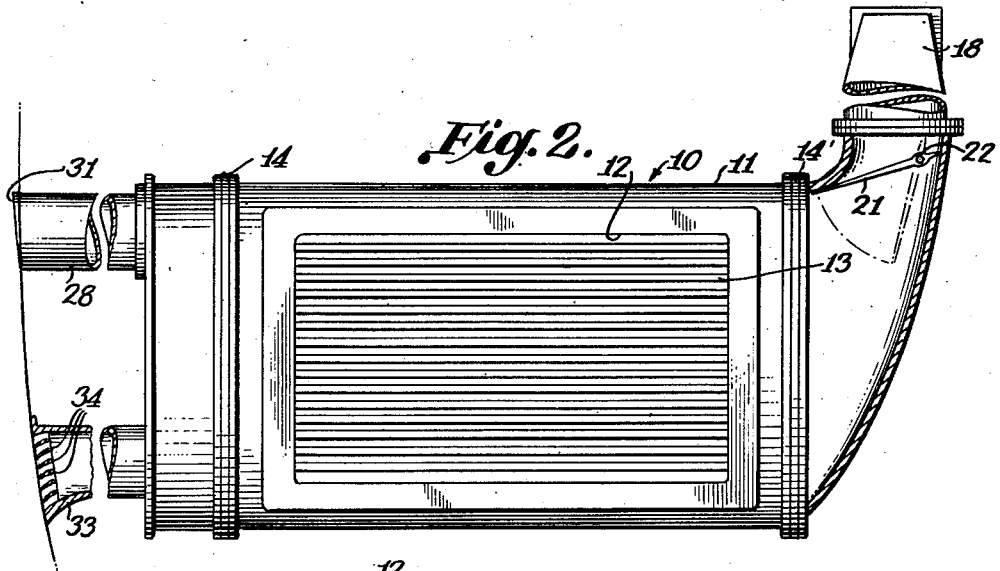
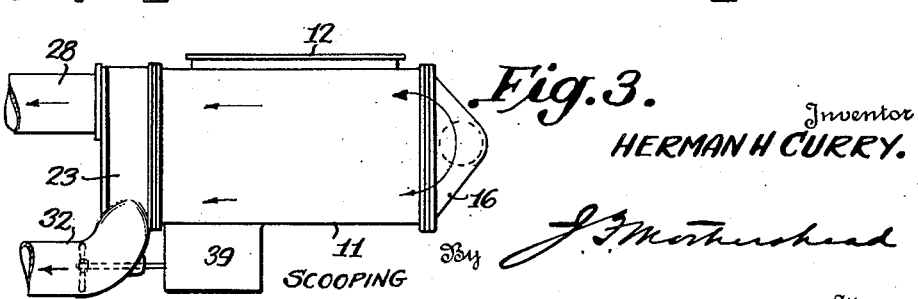

2,220,081

UNITED STATES PATENT OFFICE 2,220,081

MARINE STEAM CONDENSER ARRANGEMENT

Herman H. Curry, Montgomery County, Md.

Application October 14, 1939, Serial No. 299,459

15 Claims. (Cl. 257—26)

(Granted under the act of March 3, 1883, as amended April 30, 1928; 370 O. G. 757)

This invention relates to a marine condenser installation of the general type having scoop means for supplying circulating water to the tube nest at cruising speeds and having a fluid translating means, such as a propeller pump, for delivering circulating water to the tube nest when the speed of the vessel is not high enough to enable the scoop means to deliver circulating water under the requisite pressure. In installations of this kind the fluid translating means is frequently located in the scoop through which circulating water is supplied at cruising speeds. When the ship is under way at adequate speed so that the propeller pump, for example, is not needed, the incoming circulating water flows around the blades of the propeller pump, thereby producing a turbulence which results in an objectionable liberation of air, which attacks the condenser tubes. Moreover, when the auxiliary pump is located in the inlet scoop, as it usually is, the capacity of this pump must be large enough to deliver the large volume of water required to supply all of the tubes with cooling water, even though the heat transfer capacity of this large volume of water is not needed at idling and manoeuvering speeds. It also happens with vessels operating in shallow waters that an objectionable amount of debris, such as mud, sand, weeds, and the like, are passed through the inlet scoop to the tube nest, thereby causing unnecessary wear on the tubes, lowering the thermal efficiency and necessitating frequent cleaning.

The purposes of this invention are to overcome objectionable features of the kind just mentioned by providing for improving the thermal as well as the operating efficiency of an installation of the class described; to provide for eliminating the turbulence caused by the pump in the inlet scoop; to provide adequate circulation of cooling water at idling and manoeuvering speeds with a smaller capacity pump; to provide for supplying circulating water substantially free from debris when operating in shallow waters; to provide for facilitating cleaning a condenser of the class described; and also to provide a condenser of the class described having an improved construction and relative arrangement of parts.

In accordance with this invention, a marine surface condenser may be equipped with a scoop for supplying circulating water to one end of the tube nest, and a divided water box may be arranged at the other end of the tube nest and provided with outboard connections from its compartment so that the circulating water supplied by the scoop may be discharged from the tube nest through the divided water box and its outboard connections, thereby providing a single pass condenser at cruising speeds, for example. When the vessel operates at a lower speed than that at which the requisite velocity-pressure head prevails in the scoop to assure good flow through the tubes, as at manoeuvering and idling speeds, the circulating water may be supplied to one compartment of the divided water box and, after a plurality of passes through the tube nest, discharged overboard. This mode of operation assures maximum heat transfer while the velocity-pressure head is utilized to pass the cooling water through the tube nest in a single pass at cruising speeds of the vessel where high heat transfer is required. At idling and manoeuvering speeds, the multiple pass arrangement gives adequate heat transfer and also makes possible the use of smaller capacity auxiliary pumping apparatus while the main scoop is ineffective. This multiple pass arrangement also makes it possible substantially to eliminate turbulence and to provide for good streamline flow in the inlet scoop, thereby avoiding objectionable liberation of occluded oxygen in the inlet scoop, by locating the auxiliary circulating pump in one of the outboard connections of the divided water box.

The invention also provides for supplying circulating water from the side instead of from the bottom of the hull at idling and at manoeuvering speeds, as by locating preferably both of the outboard connections of the divided water box at points on the side of the hull. This facilitates cleaning of the circulating system and avoids frequent clogging thereof, especially when the ship is in shallow waters, by supplying circulating water from a region in which debris of various kinds is far less plentiful than it is on the bottom.

The invention further provides for improving efficiency at cruising speeds by supplying a greater quantity of water to cooling tubes which are most effective in producing condensation, such as the tubes adjacent the steam inlet as distinguished from those tubes usually in the lower portion of the condenser which are utilized largely in cooling air and non-condensable gases. An important feature resides in the use of scoops of the velocity-pressure conversion type for supplying cooling water both for ahead and astern operation, discharging through the astern scoop at cruising speeds and thereby gaining the benefit of the pressure-velocity conversion reaction in the astern scoop which reaction is in a direction to assist the ship on its course.

The features of the invention are illustrated in the accompanying drawing, wherein Fig. 1 is an elevation of the astern side of a marine condenser with parts omitted and broken away for purposes of illustration;

Fig. 2 is a top plan view of the condenser shown in Fig. 1, with parts also omitted and broken away; and Fig. 3 is an elevational view similar to Fig. 1, but illustrating another mode of operation.

In the embodiment selected for illustration, the condensing equipment comprises a marine surface condenser indicated generally at 10, and comprising a shell 11 having a steam inlet 12. A nest of tubes 13 is disposed within the shell and mounted in tube sheets 14 and 14'. At one end of the shell, as at the right end as viewed in Figs. 1 and 2, a water box 16 may be arranged to supply cooling water to all of the tubes of the tube nest 13. An inlet conduit 17 may be connected in any approved manner between this water box 16 and a main inlet scoop 18 mounted in the bottom 19 of the ship's hull. This main inlet scoop 18 may be, and preferably is of the type adapted to produce a velocity-pressure conversion of incoming water to provide adequate static head for passing the cooling water through the condenser tubes 13, as fully explained in the patent to Schmidt, No. 2,106,961, granted Feb. 1, 1938, to which reference may be had for a better understanding of the features of construction, the principle and mode of operation thereof.

The water box 16 may be, and preferably is equipped with a pressure responsive valve for controlling the flow of circulating water between this water box and inlet conduit 17. This valve may comprise a disk like valve member 21 pivotally supported on a pivot pin 22 mounted in the water box 16, so that the valve member 21 may swing about its pivotal mounting between its closed position, as shown in full lines in Figs. 1 and 2, and its open position indicated in dotted lines in Fig. 2. It will be evident that when the pressure of water from the inlet conduit is the greater, this valve will respond to this pressure and swing to its open position as indicated in dotted lines in Fig. 2. In order to minimize its resistance to flow, the edges of valve member 21 preferably are thinned, the body of the valve member being tapered substantially in opposite directions from its pivotal mounting substantially as shown, so as to provide for good streamline flow around this valve when the latter is in its open position. It will also be evident that when the pressure of water issuing from the tubes 13 into the water box 16 exceeds that from water in conduit 17, the valve member 21 will swing to its closed position as shown in full lines in Figs. 1 and 2, and thereby prevent water from being discharged from water box 16 into conduit 17.

The opposite end of the condenser, as the left end as viewed in Figs. 1 and 2, may be equipped with a divided water box 23 having a partition 24 forming separate compartments 26 and 27 for circulating water. An outboard connection or conduit 28 may extend from compartment 26 through the side 29 of the ship's hull and this outboard conduit may also be provided with a lip 31 on the forward side of its outboard end substantially as shown. This outboard conduit 28 is adapted to serve always as a discharge conduit for circulating water. In some installations, therefore, as on high speed naval vessels such as destroyers, it may be advantageous to omit the lip 31 and thereby reduce the resistance to motion of the ship by that amount. On lower speed vessels, such as the cutters used by the Coast Guard, this lip may be used advantageously, as it reduces the discharge pressure on the circulating water being discharged through this conduit when the ship is under forward headway, as fully explained in an article by H. Schmidt in the February, 1930, issue of the Journal of the American Society of Naval Engineers, pp. 31–35, to which reference may be had for a better understanding of the principle and mode of operation of this feature.

From the compartment 27 of water box 23 a conduit 32 extends outboard and preferably has its outboard end substantially flush with the side 29 of the ship's hull. Preferably the outboard end section of this conduit is in the form of a scoop 33 of the velocity-pressure conversion type shown in the patent to Schmidt, No. 2,106,961, as previously pointed out herein. As shown in Fig. 2, this scoop is equipped with means, such as the vanes 34, providing inwardly divergent passages therebetween, and arranged for receiving water and effecting the desired velocity-pressure conversion when the ship is proceeding astern. Preferably the total of the exit area of discharge conduit 28 and the flow area between the vanes 34 of scoop 33 is greater than the flow area between similar vanes (not shown) on the main inlet scoop 18 by an amount sufficient to produce the requisite static head in water box 16, for reasons fully explained in the patent to Schmidt, No. 1,862,282, granted June 7, 1932, (page 4, lines 55–93) to which reference may be had for a better understanding of this feature.

Auxiliary fluid translating means for producing the requisite circulation of cooling water when the scooping action is inadequate, may comprise a propeller pump comprising a suitable propeller 36 disposed within conduit 32 and mounted upon a shaft 37 which is rotatably supported in fluid tight relation in a bushing 38. This shaft may extend to any suitable source of power, as to a prime mover such as the electric motor 39 mounted at the base of the condenser.

In the operation of this improved condenser installation, when the ship is proceeding forwardly at cruising speed or at such speed that the scooping action is adequate, the main scoop 18 supplies cooling water through the conduit 17, around the valve 21, which opens in response to pressure, and through all the tubes in the tube nest in a single pass to water box 23. Circulating water issuing from the tube nest into compartment 26 of water box 23 is discharged overboard through conduit 28. Circulating water issuing from the tube nest into compartment 27 of water box 23 is discharged overboard through conduit 32 and scoop 33. In passing through conduit 32, the circulating water passes around the blades of propeller 36 which may rotate idly. Any turbulence and attendant liberation of occluded gases which may occur as the water passes around the propeller can do no harm, as this water passes overboard and not to the condenser tubes. As the propeller to a certain extent impedes or restricts the discharge through conduit 32, it will be seen that the propeller retards the flow through those tubes which are in communication with the compartment 27 of water box 23, and the latter tubes are those in the lower portion of the condenser which usually function principally to cool air and non-condensable gases. If the air off-take is not located in the lower half of the tube nest, the partition 24 in water box 23 may be rearranged so that the circulating water discharged through conduit 32 is that which is used largely for cooling air and non-condensable gases. It will be evident from the foregoing that this arrangement increases the flow through the upper tubes which communicate with the upper compartment 26 from which the circulating water is discharged overboard through conduit 28 which is free from any obstruction, such as propeller 36, which would tend to retard the flow through these tubes. This gives maximum flow of circulating water and hence, greater heat transfer capacity to those tubes which are adjacent the steam inlet and are therefore the most effective in condensing steam. Furthermore, while operating in this manner as a single pass condenser, circulating water passing overboard through the vanes 34 of scoop 33 undergoes a pressure-velocity conversion producing a reacting force, the direction of which is such as to assist the forward motion of the ship. This mode of operation is indicated by the arrows in Fig. 3.

When the ship is proceeding ahead, or manoeuvering, or idling, or proceeding astern, as proceeding forwardly at a speed at which the scooping action is inadequate, or operating under conditions where the scooping action of the main scoop 18 in ineffective, the condenser may be operated advantageously as a multi-pass condenser. Thus, for example, when the ship is proceeding astern, (Fig. 2) the scoop 33 functions as the inlet scoop to supply circulating water to the lower compartment 27 of water box 23. It will be noted that the incoming circulating water undergoes a velocity-pressure conversion in passing through the vanes 34 of this scoop, thereby providing static head. The circulating water is then conducted from compartment 27 in a first pass through those tubes in the lower part of the tube nest which communicate with compartment 27 to water box 16 where the pressure of water issuing from these tubes closes valve 21, thereby preventing escape of this water through conduit 17 and scoop 18. From water box 16, the circulating water passes through the tubes in the upper part of the tube nest in a second pass into compartment 26 of water box 23, from which compartment the circulating water is discharged overboard through conduit 28. During this mode of operation it is usually necessary to operate the propeller pump to assist the flow of circulating water. This may be done conveniently by merely closing the motor switch (not shown) for the motor 39. The flow of circulating water during this mode of operation is indicated by the arrows in Fig. 1.

Important advantages of this multi-pass condenser system, for operation of the ship at speeds below those at which the main scoop 18 is effective, are improved thermal and mechanical efficiency obtained by passing a relatively small quantity of circulating water through the condenser tubes at high velocity, thereby providing higher heat transfer capacity per unit tube length, and this high velocity of flow and higher heat transfer capacity may be obtained with auxiliary pumping apparatus of relatively small capacity compared to that required for single pass operation at idling and manoeuvering speeds, as shown for example in the patent to Schmidt, No. 2,106,961, granted Feb. 1, 1938.

Fouling of the condenser tubes and one tube sheet commonly occurs at the tube sheet and in the ends of the tubes which are adjacent the main inlet scoop. When the auxiliary pumping apparatus is located in the main inlet conduit connecting with the main inlet scoop, as in Schmidt Patent No. 2,106,961, experience has shown that the pump may become fouled with seaweed, or in at least one instance with a line. The turbulence caused by water passing around a pump located in the inlet scoop when the pump is idle at cruising speeds (the greatest percentage of the time) liberates occluded oxygen which attacks the condenser tubes.

It will be seen that my improved construction avoids the above-mentioned disadvantages. In this improved construction the main inlet conduit is free from mechanical equipment, such as a pump, which might become fouled at cruising speeds, when it is not operating, and its inoperative condition not be discovered until it was needed at idling or manoeuvering speeds. It will be noted that with this improved construction the pump is located in conduit 32 through which water flows outwardly on single pass operation and inwardly on double pass operation. This reversal of flow has at least a tendency to remove from the pump any matter lodged thereon and which otherwise might render it inoperative or at least very inefficient.

As a ship usually operates the greatest percentage of time at cruising speeds, it will be seen that when the auxiliary pump is located in the main inlet conduit and of course not operated at cruising speeds, such a pump is a source of turbulence and liberation of occluded gases which pass to the condenser tubes during the greatest percentage of the time that the ship is operating. In my improved construction, on single pass operation at cruising speeds when the auxiliary pump is not operating, the direction of flow is such that gases liberated by this pump go, not to the condenser tubes, but overboard. In my construction when the auxiliary pump is operating on double pass operation of the condenser, the liberation of occluded gases due to turbulence is less than when the pump is not operating.

My improved construction also facilitates cleaning of the circulatory system of the condenser. This may be accomplished by operating the auxiliary pump to back-wash the lower portions of the tube nest, tube sheet 14' and water box 16, which are the places where the largest amount of foreign matter commonly collects. It will be evident that this cleaning operation will ordinarily take place automatically at intervals during the normal operation of the vessel. As the invention also provides for supplying circulating water for double pass operation from a region adjacent the side of the hull where debris is less prevalent than on the bottom in shallow waters, there is less likelihood of fouling the condenser when idling or manoeuvering in shallow waters.

It sometimes happens that a ship may be idling in shallow water over a mud bank or a bottom consisting largely of sand or fine gravel. In this situation, if the condenser circulating water is discharged through the bottom of the hull, the turbulence produced by the continual flow of this relatively large volume of hot water tends to rile up the bottom to such an extent that particles, such as sand, gravel and the like, may be dislodged from the bottom and drawn in through the inlet scoop into the condenser circulatory system. This undesirable result may be avoided in accordance with this invention, by arranging the idling discharge conduit, such as the conduit 28, so that it discharges through the side of the hull where the warm condenser water has a tendency to go to the surface.

A further advantage of the present invention resides in the arrangement of the main scoop 18 for receiving water through the bottom of the hull from a point at a greater depth than that taken in at the side of the hull. The water at this greater depth is under a greater pressure and therefore it has a lower content of occluded gases than water nearer the surface. It will be seen therefore that the invention provides for supplying water at cruising speeds from a depth where the occluded gas content is less, and for receiving and discharging circulating water at idling and manoeuvering speeds at depths where these operations are less likely to rile up the bottom or to pick up debris from the bottom.

The invention described herein, if patented, may be manufactured and used by or for the Government for governmental purposes without the payment to me of any royalty thereon.

It should be understood that the present disclosure is for the purposes of illustration only, and that the invention includes all modifications and equivalents which fall within the scope of the appended claims.

I claim as my invention and desire to secure by my patent:

1. A scoop condenser for a marine installation comprising a shell, a nest of tubes disposed within the shell, scoop means for directing circulating water through a given number of said tubes in a single pass at cruising speeds, and means for directing circulating water through said given number of tubes in a plurality of passes when operating at manoeuvering and idling speeds.

2. A scoop condenser for a marine installation comprising a shell, a nest of tubes disposed within the shell, scoop means for directing circulating water through a given number of said tubes in a single pass at cruising speeds, and means for directing circulating water through said given number of tubes in a plurality of passes when operating at manoeuvering and idling speeds, and fluid translating means cooperating with the latter means.

3. A scoop condenser for a marine installation comprising a shell, a nest of tubes disposed within the shell, scoop means operable at cruising speeds for supplying circulating water at one end of said shell to a given number of said tubes, a divided water box at the other end of said shell, and connections for supplying circulating water to and for discharging circulating water from said divided water box, one of said connections serving for supplying circulating water to part of said given number of tubes during manoeuvering and idling speeds and for discharging circulating water from said part of said given number of tubes at cruising speeds.

4. A scoop condenser for a marine installation comprising a shell, a nest of tubes disposed within the shell, scoop means operable at cruising speeds for supplying circulating water at one end of said shell to a given number of said tubes, a divided water box at the other end of said shell, connections for supplying circulating water to and for discharging circulating water from said divided water box, one of said connections serving for supplying circulating water to part of said given number of tubes during manoeuvering and idling speeds and for discharging circulating water from said part of said given number of tubes at cruising speeds and fluid translating means operatively associated with one of said connections.

5. A scoop condenser for a marine installation comprising a shell, a nest of tubes disposed within the shell, scoop means operable at cruising speeds for supplying circulating water at one end of said shell to a given number of said tubes, a divided water box at the other end of said shell, and outboard connections to different compartments of said divided water box, one of these connections being adapted to serve as an inlet for circulating water to part of said given number of tubes and the other of these connections being adapted to serve as an outlet for circulating water from the remainder of said given number of tubes when operating at manoeuvering and idling speeds, and a fluid translating means disposed in said one of said connections.

6. A marine condenser installation of the class described, comprising a shell, a nest of tubes disposed within the shell, scoop means operable at cruising speeds for supplying circulating water from an outboard side of the ship to a given number of said tubes at one end of said tube nest, valve means for closing said scoop means at manoeuvering and idling speeds, a divided water box at the other end of said tube nest, normally open connections between different compartments of said water box and an outboard side of the ship, and fluid translating means operable at manoeuvering and idling speeds for delivering circulating water to the tube nest through one of said connections and for discharging circulating water from the other of said connections.

7. A surface condenser for a marine installation, comprising a shell, a nest of tubes disposed therein, scoop means for supplying cooling water from the bottom of the ship's hull to one end of the tube nest to substantially all of the tubes thereof for single pass operation at cruising speeds, and means for supplying cooling water from the side of the ship's hull to a portion of the tubes at the other end of the tube nest for multipass operation at manoeuvering and idling speeds.

8. A surface condenser for a marine installation, comprising a shell, a nest of tubes disposed therein, scoop means for supplying cooling water from the bottom of the ship's hull to one end of the tube nest to substantially all of the tubes thereof for single pass operation at cruising speeds, conduit means for supplying cooling water from the side of the ship's hull to a portion of the tubes at the other end of the tube nest for multipass operation at manoeuvering and idling speeds, and fluid translating means disposed in said conduit means for producing the requisite flow of cooling water at idling and manoeuvering speeds.

9. A surface condenser for a marine installation, comprising a shell, a nest of tubes disposed therein, scoop means for supplying cooling water from the bottom of the ship's hull to one end of the tube nest to substantially all of the tubes thereof for single pass operation at cruising speeds, conduit means for supplying cooling water from the side of the ship's hull to a portion of the tubes at the other end of the tube nest for multipass operation at manoeuvering and idling speeds, a scoop associated with said conduit means for producing a velocity-pressure conversion of incoming water to provide static head, and fluid translating means disposed in said conduit means for assisting in producing adequate flow of cooling water at idling and manoeuvering speeds.

10. A surface condenser for a marine installation, comprising a shell, a nest of tubes disposed therein, scoop means for supplying cooling water from the bottom of the ship's hull to one end of the tube nest to substantially all of the tubes thereof for single pass operation at cruising speeds, and conduit means disposed between the side of the ship's hull and the other end of the tube nest for supplying cooling water to a portion of the tubes for multi-pass operation at idling and manoeuvering speeds and for discharging circulating water from said portion of the tubes at single pass operation at cruising speeds.

11. A surface condenser for a marine installation, comprising a shell, a nest of tubes disposed therein, scoop means for supplying cooling water from the bottom of the ship's hull to one end of the tube nest to substantially all of the tubes thereof for single pass operation at cruising speeds, conduit means disposed between the side of the ship's hull and the other end of the tube nest for supplying cooling water to a portion of the tube nest for multi-pass operation at idling and manoeuvering speeds and for discharging circulating water from said portion of the tubes at single pass operation at cruising speeds, and fluid translating means disposed in said conduit means for assisting in producing adequate flow at idling and manoeuvering speeds.

12. A surface condenser for a marine installation, comprising a shell, a nest of tubes disposed therein, scoop means for supplying cooling water from the bottom of the ship's hull to one end of the tube nest to substantially all of the tubes thereof for single pass operation at cruising speeds, conduit means disposed between the side of the ship's hull and the other end of the tube nest for supplying cooling water to a portion of the tubes for multi-pass operation at manoeuvering and idling speeds and for discharging circulating water from said portion of the tubes on single pass operation at cruising speds, and a scoop associated with said conduit means for producing a velocity-pressure conversion on incoming water to provide static head and for producing a pressure-velocity conversion on discharging water, thereby producing a reaction which assists the ship on its course.

13. A surface condenser for a marine installation, comprising a shell, a nest of tubes disposed therein, scoop means for supplying cooling water from the bottom of the ship's hull to one end of the tube nest to substantially all of the tubes thereof for single pass operation at cruising speeds, conduit means disposed between the side of the ship's hull and the other end of the tube nest for supplying cooling water to a portion of the tubes for multi-pass operation at manoeuvering and idling speeds and for discharging circulating water from said portion of the tubes on single pass operation at cruising speeds, fluid translating means disposed in said conduit means for assisting in producing adequate flow on multi-pass operation, and a scoop associated with said conduit means for producing a velocity-pressure conversion on incoming water to provide static head and for producing a pressure-velocity conversion on discharging water to produce a reaction which assists the ship on its course.

14. A surface condenser for a marine installation, comprising a shell having a steam inlet, a nest of tubes disposed within the shell, scoop means for supplying cooling water from the bottom of the ship's hull to substantially all of the tubes at one end of the tube nest for single pass operation at cruising speeds, one conduit means disposed between a side of the ship's hull and the other end of the tube nest for discharging circulating water from the portion of the tubes disposed adjacent the steam inlet of the condenser, and another conduit means disposed between a side of the ship's hull and said other end of the tube nest for discharging circulating water from another portion of said tubes on single pass operation at cruising speeds and for supplying circulating water to said another portion of tubes on multi-pass operation at manoeuvering and idling speeds.

15. A surface condenser for a marine installation, comprising a shell having a steam inlet, a nest of tubes disposed within the shell, scoop means for supplying cooling water from the bottom of the ship's hull to substantially all of the tubes at one end of the tube nest for single pass operation at cruising speeds, one conduit means disposed between a side of the ship's hull and the other end of the tube nest for discharging circulating water from the portion of the tubes disposed adjacent the steam inlet of the condenser, another conduit means disposed between a side of the ship's hull and said other end of the tube nest for discharging circulating water from another portion of said tubes on single pass operation at cruising speeds and for supplying circulating water to said another portion of tubes on multi-pass operation at manoeuvering and idling speeds, and fluid translating means disposed in said another conduit means.

HERMAN H. CURRY.